United States Patent
Le et al.

(10) Patent No.: US 11,259,333 B2
(45) Date of Patent: Feb. 22, 2022

(54) COMMUNICATION CONNECTION METHOD AND BASE STATION

(71) Applicant: Huawei Technologies Co., Ltd., Shenzhen (CN)

(72) Inventors: Chunhui Le, Shanghai (CN); Jingjing Zhang, Shanghai (CN); Yicheng Zheng, Dongguan (CN); Bin Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 16/722,232

(22) Filed: Dec. 20, 2019

(65) Prior Publication Data

US 2020/0128590 A1 Apr. 23, 2020

Related U.S. Application Data (63) Continuation of application No. PCT/CN2018/092976, filed on Jun. 27, 2018.

(30) Foreign Application Priority Data

Jun. 30, 2017 (CN) .......................... 201710525049.2

(51) Int. Cl.
| | |
|---|---|
| *H04J 3/08* | (2006.01) |
| *H04W 74/08* | (2009.01) |
| *H04W 56/00* | (2009.01) |
| *H04W 64/00* | (2009.01) |
| *H04W 74/00* | (2009.01) |

(52) U.S. Cl.
CPC ..... *H04W 74/0833* (2013.01); *H04W 56/004* (2013.01); *H04W 64/00* (2013.01); *H04W 74/006* (2013.01)

(58) Field of Classification Search
CPC ........... H04W 56/004; H04W 56/0045; H04W 64/00; H04W 74/006; H04W 74/0833
USPC ................. 370/329, 336, 311, 312, 280, 252
See application file for complete search history.

(56) References Cited

U.S. PATENT DOCUMENTS

| | | | |
|---|---|---|---|
| 2011/0128873 | A1 | 6/2011 | Farag |
| 2013/0242953 | A1 | 9/2013 | Malkamäki et al. |
| 2015/0146631 | A1* | 5/2015 | Kim ...................... H04L 5/0053 370/329 |

(Continued)

FOREIGN PATENT DOCUMENTS

| | | |
|---|---|---|
| CN | 101039154 A | 9/2007 |
| CN | 101772175 A | 7/2010 |

(Continued)

*Primary Examiner* — Joseph Arevalo
(74) *Attorney, Agent, or Firm* — Slater Matsil, LLP (57) ABSTRACT

A method includes: adjusting, by a base station based on a timing adjustment amount, an access timing advance corresponding to user equipment to obtain a target timing advance, where the access timing advance is a timing advance obtained when the user equipment randomly accesses the base station; determining, by the base station based on the target timing advance, whether the user equipment meets a trigger condition; and if the user equipment meets the trigger condition, sending, by the base station, a trigger signal to the user equipment, where the trigger signal is used to trigger the user equipment to send a first random access request to the base station.

13 Claims, 4 Drawing Sheets

(56) References Cited

U.S. PATENT DOCUMENTS

| | | | |
|---|---|---|---|
| 2015/0237648 A1 | 8/2015 | Zhang et al. | |
| 2016/0127064 A1* | 5/2016 | Liu | H04J 3/0623 370/294 |
| 2017/0151952 A1* | 6/2017 | Kamiya | B60W 10/026 |
| 2017/0311251 A1* | 10/2017 | Liu | H04W 8/02 |
| 2021/0144712 A1* | 5/2021 | Jiang | H04W 72/1284 |
| 2021/0211956 A1* | 7/2021 | Kim | H04W 12/043 |

FOREIGN PATENT DOCUMENTS

| | | |
|---|---|---|
| CN | 101854646 A | 10/2010 |
| CN | 102647783 A | 8/2012 |
| CN | 103874153 A | 6/2014 |
| CN | 103918339 A | 7/2014 |
| CN | 104159270 A | 11/2014 |
| CN | 107404749 A | 11/2017 |
| EP | 2427018 A1 | 3/2012 |
| KR | 20120085867 A | 8/2012 |
| WO | 2008115247 A1 | 9/2008 |
| WO | 2012091649 A1 | 7/2012 |
| WO | 2016157808 A1 | 10/2016 |
| WO | 2016161545 A1 | 10/2016 |

\* cited by examiner

COMMUNICATION CONNECTION METHOD AND BASE STATION

CROSS-REFERENCE TO RELATED APPLICATIONS

This application is a continuation of International Application No. PCT/CN2018/092976, filed on Jun. 27, 2018, which claims priority to Chinese Patent Application No. 201710525049.2, filed on Jun. 30, 2017. The disclosures of the aforementioned applications are hereby incorporated by reference in their entireties.

TECHNICAL FIELD

This application relates to the communications field, and in particular, to a communication connection method and a base station.

BACKGROUND

Many islands or sea areas do not have their own base stations. Communication for these islands or sea areas, if required, needs to rely on a land-based base station. However, a distance between a land-based base station and an island or a sea area may exceed 100 kilometers or even more, posing a challenge to a random access technology. According to an existing protocol or standard, only a cell radius within 100 kilometers can be covered in a long term evolution (LTE) system. When the cell radius exceeds 100 kilometers, user equipment (UE) cannot communicate with a base station normally due to a limitation of the protocol on a physical random access channel frame format (PRACH), a limitation of a timing advance (TA) delivered to the UE and a limitation of a UE processing capability.

In the current system, to detect UE beyond a 100-kilometer range, a base station may extract a signal again after a PRACH signal is normally extracted; separately correlate two extracted signals with a local sequence; and determine, based on relative sizes of correlation peak values of the two signals, whether the UE falls within the 100-kilometer range. Due to the protocol limitation, an uplink signal cannot be aligned at the base station when the UE is 100 kilometers away from the base station, thereby destroying orthogonality of an orthogonal frequency division multiplexing (OFDM) system.

To overcome the existing protocol limitation, for the UE beyond the 100-kilometer range, the base station may deliver an appropriate TA to postpone alignment of the uplink signal of the UE by one slot, thereby maintaining orthogonality of OFDM symbols.

However, the base station does not learn of a location of the UE when the UE is in a connected state. Therefore, when the UE outside 100 kilometers moves towards the base station to reach a 100-kilometer boundary, the base station still postpones alignment of the uplink signal of the UE by one slot because the base station does not know a distance between the UE and the base station. Alternatively, when UE within 100 kilometers moves away from the base station to reach a 100-kilometer boundary, because the base station does not know a distance between the UE and the base station, the base station still aligns an uplink signal of the UE in a normal slot without postponing by one slot. In both cases, a call drop may occur on the UE at the 100-kilometer boundary, affecting user experience.

SUMMARY

Embodiments of this application provide a communication connection method and a base station, to implement seamless transition of UE at a 100-kilometer boundary and improve user experience.

In view of this, a first aspect of this application provides a communication connection method. The method includes: after user equipment completes random access to a base station, adjusting, by the base station based on a timing adjustment amount, an access timing advance corresponding to the user equipment to obtain a target timing advance; determining, based on the target timing advance, whether the user equipment meets a trigger condition; and when determining that the user equipment meets the trigger condition, sending, by the base station, a trigger signal to the user equipment, so that the user equipment sends a first random access request to the base station based on the trigger signal.

It should be noted that the access timing advance is a timing advance obtained when the user equipment completes the random access, that is, a timing advance used by the user equipment to adjust an uplink signal transmitted to the base station.

In this embodiment of this application, the base station may adjust, based on the timing adjustment amount, the access timing advance corresponding to the user equipment, and then determine, based on the adjusted timing advance, whether the user equipment meets the trigger condition. When determining that the user equipment meets the trigger condition, the base station may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

With reference to the first aspect of this application, in a first implementation of the first aspect of this application, the user equipment is a near user, and the base station may specifically determine, in the following manner, whether the user equipment meets the trigger condition: determining, by the base station, whether the target timing advance is greater than a first preset threshold; and if the target timing advance is greater than the first preset threshold, determining, by the base station, that the user equipment meets the preset trigger condition.

It should be understood that, in this embodiment of this application, the near user refers to user equipment whose distance from the base station is within a preset value in a process in which the user equipment randomly accesses the base station.

It should further be understood that, in this embodiment of this application, the first preset threshold is related to a radius of an area to which the near user belongs, that is, related to an inner circle radius.

This embodiment of this application provides a manner of determining whether the user equipment meets the trigger condition, thereby improving implementability of the solution.

With reference to the first aspect of this application, in a second implementation of the first aspect of this application, the user equipment is a remote user, and the base station may specifically determine, in the following manner, whether the user equipment meets the trigger condition: determining, by the base station, whether the target timing advance is greater than a second preset threshold; and if the target timing advance is greater than the second preset threshold, determining, by the base station, that the user equipment meets the trigger condition.

It should be understood that, in this embodiment of this application, the remote user refers to user equipment whose distance from the base station is beyond a preset value in a process in which the user equipment randomly accesses the base station.

It should further be understood that, in this embodiment of this application, a value of the second preset threshold is usually set near 0, and may be a positive number or a negative number.

This embodiment of this application provides another manner of determining whether the user equipment meets the trigger condition, thereby improving flexibility of the solution.

With reference to the first aspect, or the first or the second implementation of the first aspect of this application, in a third implementation of the first aspect of this application, before adjusting the access timing advance, the base station may perform the following steps: receiving, by the base station, a second random access request sent by the user equipment, demodulating the second random access request at a first reference moment to obtain first information, and demodulating the second random access request at a second reference moment to obtain second information; and determining, based on the first information and the second information, that the user equipment is a near user or a remote user.

This embodiment of this application provides a manner in which the base station determines that the user equipment is a near user or a remote user, thereby improving implementability of the solution.

With reference to the third implementation of the first aspect of this application, in a fourth implementation of the first aspect of this application, the first information includes a first timing advance corresponding to the user equipment, and a first correlation peak value between an access sequence corresponding to the second random access request and a first reference sequence; and the second information includes a second timing advance corresponding to the user equipment, and a second correlation peak value between the access sequence corresponding to the second random access request and a second reference sequence; and the base station may specifically determine, in the following manner, that the user equipment is a near user or a remote user: if the first correlation peak value is greater than the second correlation peak value and the first timing advance is less than a third preset threshold, determining, by the base station, that the user equipment is a near user; if the first correlation peak value is greater than the second correlation peak value and the second timing advance is greater than a fourth preset threshold, determining, by the base station, that the user equipment is a near user; if the first correlation peak value is less than the second correlation peak value, determining, by the base station, that the user equipment is a remote user; and if the first timing advance is greater than a third preset threshold and the second timing advance is less than a fourth preset threshold, determining, by the base station, that the user equipment is a remote user.

In this embodiment of this application, the user equipment is identified with reference to the correlation peak value and the timing advance, so that an identification error caused by fading of a time domain signal can be avoided, improving identification accuracy.

With reference to any one of the first aspect, or the first to the fourth implementations of the first aspect of this application, in a fifth implementation of the first aspect of this application, the base station may adjust, by using the following formula, the access timing advance $TA_{rach}$ to obtain the target timing advance $T_{all}$:

$$T_{all} = TA_{rach} + TA_{Dmrs}^1 + TA_{Dmrs}^2 + \ldots TA_{Dmrs}^i, \text{where}$$

$TA_{Dmrs}^1$ represents a timing adjustment amount corresponding to a first period, $TA_{Dmrs}^2$ represents a timing adjustment amount corresponding to a second period, and $TA_{Dmrs}^i$ represents a timing adjustment amount corresponding to an $i^{th}$ period.

This embodiment of this application provides a manner of adjusting the timing advance, thereby improving implementability of the solution.

With reference to any one of the first aspect, or the first to the fifth implementations of the first aspect of this application, in a sixth implementation of the first aspect of this application, the trigger signal may include a physical downlink control order.

This embodiment of this application provides a specific form of the trigger signal, thereby improving implementability of the solution.

A second aspect of this application provides a base station. The base station includes: an adjustment module, configured to adjust, based on a timing adjustment amount, an access timing advance corresponding to user equipment to obtain a target timing advance, where the access timing advance is a timing advance obtained when the user equipment randomly accesses the base station; a judgment module, configured to determine, based on the target timing advance, whether the user equipment meets a trigger condition; and a sending module, configured to send a trigger signal to the user equipment when the judgment module determines that the user equipment meets the trigger condition, where the trigger signal is used to trigger the user equipment to send a first random access request to the base station.

With reference to the second aspect of this application, in a first implementation of the second aspect of this application, the user equipment is a near user, and the judgment module includes: a first judgment unit, configured to determine whether the target timing advance is greater than a first preset threshold; and a first determining unit, configured to: when the first judgment unit determines that the target timing advance is greater than the first preset threshold, determine that the user equipment meets the trigger condition.

It should be understood that a near user refers to user equipment whose distance from the base station is within a preset value in a random access process.

With reference to the second aspect of this application, in a second implementation of the second aspect of this application, the user equipment is a remote user, and the judgment module includes: a second judgment unit, configured to determine whether the target timing advance is less than a second preset threshold; and a second determining unit, configured to: when the second judgment unit determines that the target timing advance is less than the second preset threshold, determine that the user equipment meets the trigger condition.

With reference to the second aspect, or the first or the second implementation of the second aspect of this application, in a third implementation of the second aspect of this application, the base station may further include: a receiving module, configured to receive a second random access request sent by the user equipment; a first demodulation module, configured to demodulate the second random access request at a first reference moment to obtain first information; a second demodulation module, configured to demodulate the second random access request at a second reference moment to obtain second information; and a determining module, configured to determine, based on the first information and the second information, that the user equipment is a near user or a remote user.

With reference to the third implementation of the second aspect of this application, in a fourth implementation of the second aspect of this application, the first information includes a first timing advance corresponding to the user equipment, and a first correlation peak value between an access sequence corresponding to the second random access request and a first reference sequence; and the second information includes a second timing advance corresponding to the user equipment, and a second correlation peak value between the access sequence corresponding to the second random access request and a second reference sequence; and the determining module includes: a third determining unit, configured to: when the first correlation peak value is greater than the second correlation peak value and the first timing advance is less than a third preset threshold, determine that the user equipment is a near user; a fourth determining unit, configured to: when the first correlation peak value is greater than the second correlation peak value and the second timing advance is greater than a fourth preset threshold, determine that the user equipment is a near user; a fifth determining unit, configured to: when the first correlation peak value is less than the second correlation peak value, determine that the user equipment is a remote user; and a sixth determining unit, configured to: when the first timing advance is greater than a third preset threshold and the second timing advance is less than a fourth preset threshold, determine that the user equipment is a remote user.

With reference to any one of the second aspect, or the first to the fourth implementations of the second aspect of this application, in a fifth implementation of the second aspect of this application, the adjustment module includes: an adjustment unit, configured to adjust, by using the following formula, the access timing advance $TA_{rach}$ to obtain the target timing advance $T_{all}$:

$$T_{all} = TA_{rach} + TA_{Dmrs}^1 + TA_{Dmrs}^2 + \ldots TA_{Dmrs}^i, \text{ where}$$

$TA_{Dmrs}^1$ represents a timing adjustment amount corresponding to a first period, $TA_{Dmrs}^2$ represents a timing adjustment amount corresponding to a second period, and $TA_{Dmrs}^i$ represents a timing adjustment amount corresponding to an $i^{th}$ period.

With reference to any one of the second aspect, or the first to the fifth implementations of the second aspect of this application, in a sixth implementation of the second aspect of this application, the trigger signal may include a physical downlink control channel order.

A third aspect of this application provides a base station. The base station includes a transceiver, a processor, and a memory.

The memory is configured to store a program.

The processor is configured to execute the program, to perform the following steps: adjusting, based on a timing adjustment amount, an access timing advance corresponding to user equipment to obtain a target timing advance, where the access timing advance is a timing advance obtained when the user equipment randomly accesses the base station; determining, based on the target timing advance, whether the user equipment meets a trigger condition; and if the user equipment meets the trigger condition, controlling the transceiver to send a trigger signal to the user equipment, where the trigger signal is used to trigger the user equipment to send a first random access request to the base station.

A fourth aspect of this application provides a computer readable storage medium. The computer readable storage medium stores an instruction, and when the instruction is run on a computer, the computer is enabled to perform the method according to the foregoing aspect.

It can be learned from the foregoing technical solutions that the embodiments of this application have the following advantages:

In the embodiments of this application, the base station may adjust, based on the timing adjustment amount, the access timing advance corresponding to the user equipment, and then determine, based on the adjusted timing advance, whether the user equipment meets the trigger condition. When determining that the user equipment meets the trigger condition, the base station may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

BRIEF DESCRIPTION OF THE DRAWINGS

To describe the technical solutions in the embodiments of this application more clearly, the following briefly describes the accompanying drawings required for describing the embodiments. Definitely, the accompanying drawings described below show merely some embodiments of this application.

DETAILED DESCRIPTION OF ILLUSTRATIVE EMBODIMENTS

The following clearly and completely describes the technical solutions in the embodiments of this application with reference to the accompanying drawings in the embodiments of this application. Definitely, the described embodiments are merely some but not all of the embodiments of this application.

In the specification, the claims, and the accompanying drawings of this application, the terms "first", "second", "third", "fourth", and the like (if any) are intended to distinguish between similar objects but do not necessarily indicate any specific order or sequence. It should be understood that the data used in such a way is interchangeable in proper circumstances, so that the embodiments of this application described herein can be implemented in an order different from the order illustrated or described herein. Moreover, the terms "include", "have", and any other variants thereof are intended to cover non-exclusive inclusion. For example, a process, a method, a system, a product, or a device that includes a series of steps or units is not necessarily limited to those expressly listed steps or units, but may include another step or unit that is not expressly listed or that is inherent to the process, the method, the product, or the device.

The embodiments of this application provide a communication connection method, to implement seamless transition of UE at a 100-kilometer boundary and improve user experience.

It should be understood that a user-plane link establishment method, a base station, and a mobility management device in the embodiments of this application may be applied to various communications systems, such as a global system for mobile communications (GSM), a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) mobile communications system, or a future evolved mobile communications system.

It should be understood that, in the embodiments of this application, user equipment includes but is not limited to a mobile station (MS), a mobile terminal, a mobile telephone, a handset, portable equipment, and the like. The user equipment may communicate with one or more core networks by using a radio access network (RAN). For example, the user equipment may be a mobile telephone (also referred to as a "cellular" telephone), or a computer having a wireless communication function. Alternatively, the user equipment may be a portable, pocket-sized, handheld, computer built-in, or in-vehicle mobile apparatus.

In the embodiments of this application, the base station may be a base transceiver station (BTS) in GSM or CDMA, may be a NodeB in WCDMA, or may be an evolved NodeB (eNB, or e-NodeB) in LTE. This is not limited in the embodiments of this application.

To facilitate understanding of the embodiments of this application, the following describes examples of the technical terms used in the embodiments of this application.

Random access: In an embodiment, random access is a process in which a user sends a random access preamble to attempt to access a network and establishes a basic signaling connection to the network. Random access is a step in a mobile communications system, and a last step of establishing a communication link between user equipment and a base station.

Uplink synchronization: There is a delay in signal transmission in space. If the UE is away from the base station during data transmission, a signal sent by the base station arrives at the UE later and later. At the same time, a signal from the UE arrives at the base station later and later. An excessively long delay causes an overlap between the signal received by the base station from the UE in a current slot and a signal received by the base station from another UE in a slot, thereby causing intercode interference. Therefore, time alignment is used when uplink signals of different UEs arrive at the base station, to ensure orthogonality of the uplink signals of the UEs. In an embodiment, an uplink synchronization process includes two steps: One is to adjust a transmission time for initial access, and the other is to maintain uplink synchronization in a connected state.

Timing advance: In an embodiment, the timing advance is a difference between an actual time at which a signal of a mobile station arrives at a base station and a time at which the signal of the mobile station arrives at the base station on an assumption that a distance between the mobile station and the base station is 0. The timing advance is used to implement uplink synchronization between the base station and the user equipment.

Access timing advance: In an embodiment, the access timing advance is a timing advance obtained through measurement by the base station in a random access process of the UE, and is used to adjust a transmission time for initial access.

Timing adjustment amount: In an embodiment, the timing adjustment amount is an adjustment amount of a TA value obtained through measurement performed by the base station on a time of uplink service data of the UE in each specified period after the UE accesses a system and obtains initial uplink synchronization, and is used to maintain uplink synchronization of the UE in a connected state.

Near user: In the embodiments of this application, user equipment whose distance from the base station is within a preset value is referred to as a near user.

Remote user: In the embodiments of this application, user equipment whose distance from the base station is beyond a preset value is referred to as a remote user.

Inner circle radius: In an embodiment, a radius of an area to which the near user belongs is referred to as the inner circle radius. For example, the inner circle radius is equal to the foregoing preset value.

Figure 1:
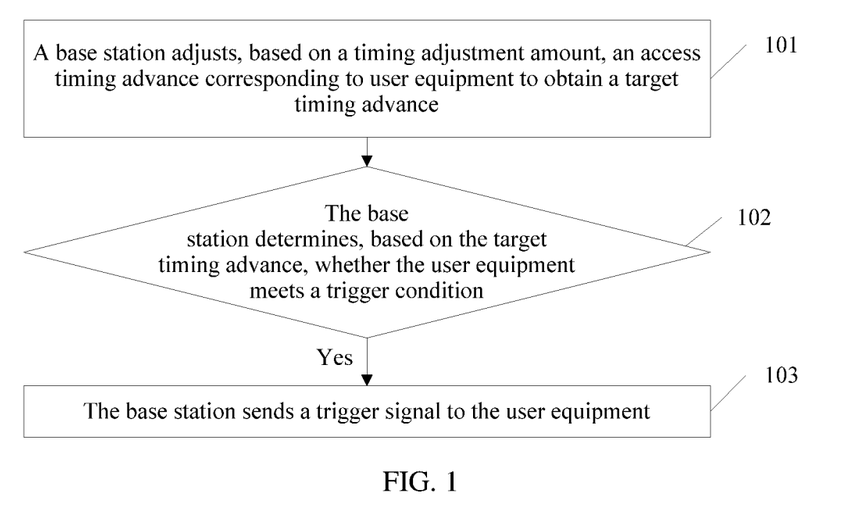
FIG. 1 is a flowchart of an embodiment of a communication connection method according to an embodiment of this application.

The following first describes the communication connection method in the embodiments of this application. Referring to FIG. 1, an embodiment of the communication connection method in the embodiments of this application includes the following steps:

101. A base station adjusts, based on a timing adjustment amount, an access timing advance corresponding to user equipment to obtain a target timing advance.

The user equipment sends a second random access request, and the base station determines, based on the second random access request, the access timing advance corresponding to the user equipment. For ease of description, in this embodiment of this application, the access timing advance obtained through current measurement is referred to as a first access timing advance.

After the user equipment completes random access and establishes a communication link to the base station, the base station obtains service data transmitted by the user equipment by using the communication link, measures the service data in each specified period to obtain a timing adjustment amount corresponding to the period, and adjusts the first access timing advance based on the timing adjustment amount to obtain the target timing advance.

102. The base station determines, based on the target timing advance, whether the user equipment meets a trigger condition; and if the user equipment meets the trigger condition, performs step 103.

In each period, after adjusting the first access timing advance to obtain the target timing advance, the base station determines, based on the target timing advance, whether the user equipment meets the trigger condition in the period; and if the user equipment meets the trigger condition, performs step 103.

103. The base station sends a trigger signal to the user equipment.

In each period, if determining that the user equipment meets the trigger condition, the base station sends the trigger signal to the user equipment, so that the user equipment sends a first random access request. After receiving the first random access request, the base station may measure an access timing advance corresponding to the user equipment again. For ease of differentiation, the access timing advance obtained through the current measurement is referred to as a second access timing advance. After the second access timing advance corresponding to the user equipment is obtained through measurement, the base station sends a random access response to the user equipment. The response includes the second access timing advance. In this way, second-time random access of the user equipment is completed.

In this embodiment of this application, the base station may adjust, based on the timing adjustment amount, the access timing advance corresponding to the user equipment, and then determine, based on the adjusted timing advance, whether the user equipment meets the trigger condition. When determining that the user equipment meets the trigger condition, the base station may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

Figure 2:
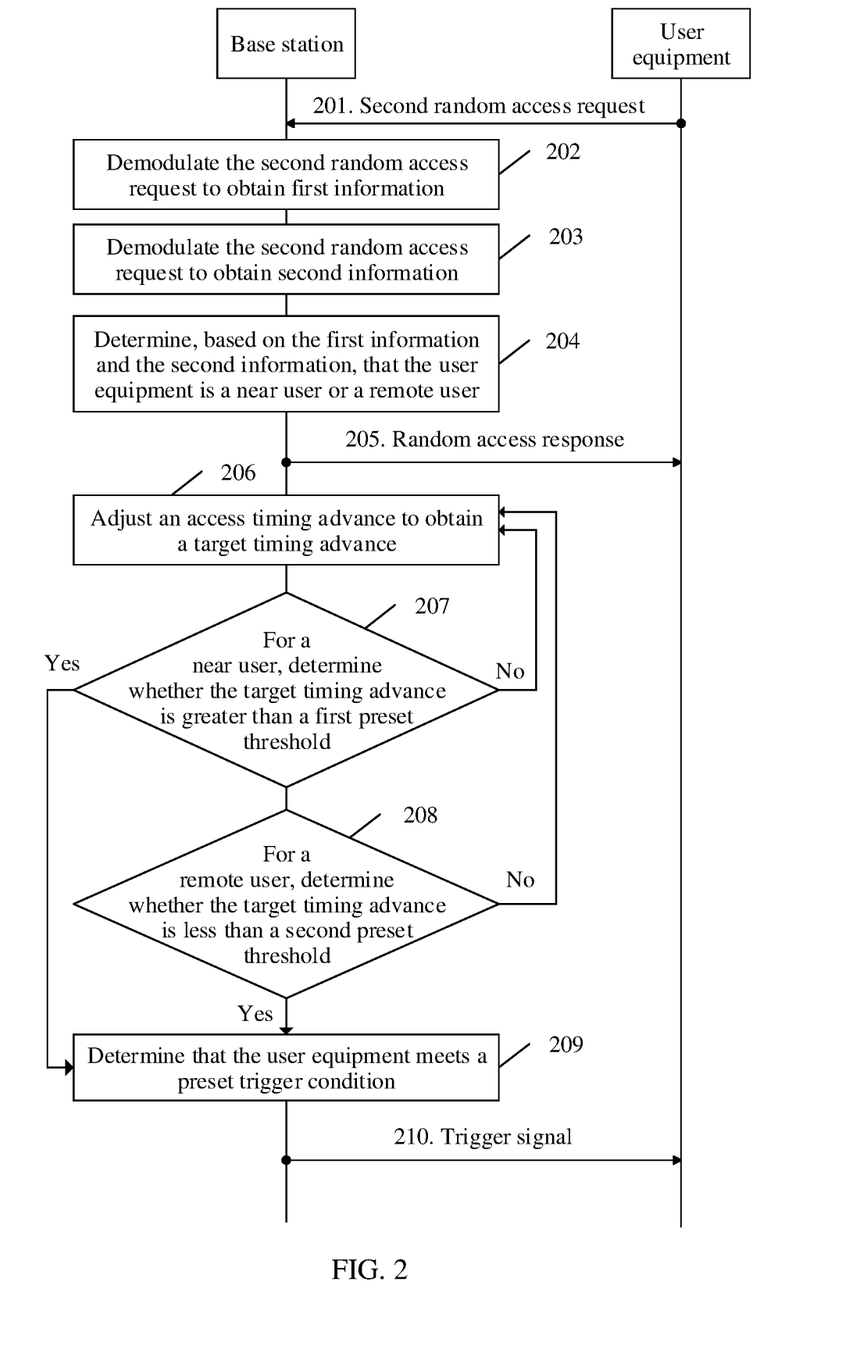
FIG. 2 is a flowchart of another embodiment of a communication connection method according to an embodiment of this application.

Based on the embodiment corresponding to FIG. 1, it can be learned that the base station may determine, in a plurality of manners, whether the user equipment meets the trigger condition. The communication connection method in the embodiments of this application is described in detail by using several of the plurality of manners as an example. Referring to FIG. 2, another embodiment of the communication connection method in the embodiments of this application includes the following steps.

201. The base station receives a second random access request sent by the user equipment.

When the user equipment needs to communicate with the base station, the user equipment sends the second random access request, and the base station receives the second random access request.

202. The base station demodulates the second random access request at a first reference moment to obtain first information.

After the second random access request arrives at the base station, the base station demodulates the second random access request at the first reference moment to obtain the first information.

203. The base station demodulates the second random access request at a second reference moment to obtain second information.

After demodulating the second random access request at the first reference moment, the base station further demodulates the second random access request at the second reference moment to obtain the second information.

It should be understood that the first reference moment and the second reference moment are moments that are preset by the base station and at which a user signal is demodulated. At these moments, the base station demodulates a received user signal. The first reference moment is earlier than the second reference moment. A difference between the first reference moment and the second reference moment is approximately an integral quantity of physical uplink shared channel (PUSCH) data symbols. The difference between the two reference moments multiplied by a light speed is equal to an inner circle radius multiplied by 2.

204. The base station determines, based on the first information and the second information, that the user equipment is a near user or a remote user.

After obtaining the first information and the second information through demodulation, the base station determines, based on the first information and the second information, that the user equipment is a near user or a remote user.

Optionally, the first information may include a first correlation peak value between an access sequence corresponding to the second random access request and a first reference sequence, and the second information may include a second correlation peak value between the access sequence corresponding to the second random access request and a second reference sequence.

It should be understood that the first reference sequence is a local sequence that uses the first reference moment as a start moment, and the second reference sequence is a local sequence that uses the second reference moment as a start moment.

After obtaining the first information and the second information through demodulation, the base station may determine, in the following manner, that the user equipment is a near user or a remote user. When determining that the first correlation peak value is greater than the second correlation peak value, the base station determines that the user equipment is a near user, and determines a first timing advance as an access timing advance of the user equipment; or when determining that the first correlation peak value is less than the second correlation peak value, the base station determines that the user equipment is a remote user, and determines a second timing advance as an access timing advance of the user equipment.

However, in the foregoing manner, due to a fading feature of a time domain signal, signal fluctuation may occur, and the first correlation peak value and the second correlation peak value are affected, thereby reducing accuracy of the foregoing identification. Therefore, in another identification manner provided in this embodiment of this application, the base station may add a timing advance, to identify the user equipment.

Optionally, in this embodiment of this application, the first information may include the first timing advance and the first correlation peak value, and the second information may include the second timing advance and the second correlation peak value. In this case, after obtaining the first information and the second information through demodulation, the base station may determine, in the following manners, that the user equipment is a near user or a remote user: when determining that the first correlation peak value is greater than the second correlation peak value, and the first timing advance is less than a third preset threshold, the base station determines that the user equipment is a near user, and determines the first timing advance as the access timing advance of the user equipment; when determining that the first correlation peak value is greater than the second correlation peak value, and the second timing advance is greater than a fourth preset threshold, the base station determines that the user equipment is a near user, and determines the first timing advance as the access timing advance of the user equipment; when determining that the first correlation peak value is less than the second correlation peak value, the base station determines that the user equipment is a remote user, and determines the second timing advance as the access timing advance of the user equipment; or when determining that the first timing advance is greater than a third preset threshold, and the second timing advance is less than a fourth preset threshold, the base station determines that the user equipment is a remote user, and determines the second timing advance as the access timing advance of the user equipment.

It should be understood that, in this embodiment of this application, in a random access process, user equipment whose distance from the base station is within a preset value is referred to as a near user, and user equipment whose distance from the base station is beyond a preset value is referred to as a remote user. Specifically, the preset value may be 100 kilometers or another preset value. This is not specifically limited in this application.

It should further be understood that, in this embodiment of this application, the third preset threshold is approximately equal to an access timing advance corresponding to user equipment whose distance from the base station is the preset value. The fourth preset threshold is set based on a user requirement, and may be specifically set based on an empirical value. The fourth preset threshold may be set to 0 or a value slightly greater than 0, or may be set to another value. This is not specifically limited herein.

205. The base station sends a random access response corresponding to the second random access request to the user equipment.

After determining that the user equipment is a near user or a remote user, the base station sends the random access response corresponding to the second random access request to the user equipment. The random access response includes the access timing advance corresponding to the user equipment. To be specific, for the near user, the random access response includes the first timing advance corresponding to the user equipment, and for the remote user, the random access response includes the second timing advance corresponding to the user equipment. For ease of description, in this embodiment of this application, the access timing advance included in the random access response is referred to as a first access timing advance.

206. The base station adjusts, based on a timing adjustment amount, the access timing advance corresponding to the user equipment to obtain a target timing advance.

After completing random access between the base station and the user equipment based on the second random access request, the base station obtains service data transmitted by the user equipment, measures the service data in each specified adjustment period to obtain a timing adjustment amount corresponding to the adjustment period, and adjusts the first access timing advance based on the timing adjustment amount to obtain the target timing advance.

Specifically, the base station may adjust, by using the following formula, the access timing advance $T_{rach}$ to obtain the target timing advance a $T_{all}$:

$$T_{all} = TA_{rach} + TA_{Dmrs}^1 + TA_{Dmrs}^2 + \ldots TA_{Dmrs}^i, \text{ where}$$

$TA_{Dmrs}^1$ represents a timing adjustment amount corresponding to a first adjustment period, $TA_{Dmrs}^2$ represents a timing adjustment amount corresponding to a second adjustment period, and $TA_{Dmrs}^i$ represents a timing adjustment amount corresponding to an $i^{th}$ adjustment period.

In other words, in each adjustment period, the base station may add a timing adjustment amount corresponding to this adjustment period, a timing adjustment amount of each adjustment period before this adjustment period, and the access timing advance, to obtain an addition result, namely, the target timing advance.

For example, if a current adjustment period is a third adjustment period, the base station may add timing adjustment amounts obtained through measurement in the first adjustment period, the second adjustment period, and the third adjustment period, and add an addition result to the access timing advance to obtain the target timing advance.

Optionally, in this embodiment of this application, the base station may measure, in the following manner, the service data to obtain a timing adjustment amount corresponding to an adjustment period. The base station measures a timing advance $TA_i$ corresponding to a current period of the UE, and then calculates, by using the following formula, a timing adjustment amount corresponding to the period:

$$TA_{Dmrs}^i = (TA_i - 31) \times 16 \text{ Ts.}$$

It should be noted that a timing advance distance corresponding to 1 Ts is equal to 4.89 meters.

207. The base station determines whether the target timing advance is greater than a first preset threshold; and if the target timing advance is greater than the first preset threshold, performs step 209; or if the target timing advance is not greater than the first preset threshold, performs step 206.

For the user equipment that is determined as the near user, the base station determines whether a target timing advance corresponding to the user equipment is greater than the first preset threshold; and if the target timing advance corresponding to the user equipment is greater than the first preset threshold, performs step 209; or if the target timing advance corresponding to the user equipment is not greater than the first preset threshold, performs step 206 again in a next specified adjustment period.

It should be understood that, in this embodiment of this application, a value of the first preset threshold $T_{th}^{up}$ is determined by using the inner circle radius. Specifically, a distance corresponding to the value of the first preset threshold may be set to be slightly greater than a value of the inner circle radius. It should be understood that the inner circle radius is determined by using the first reference time and the second reference time, and a difference between the two reference moments multiplied by a light speed is equal to the inner circle radius multiplied by 2.

208. The base station determines whether the target timing advance is less than a second preset threshold; and if the target timing advance is less than the second preset threshold, performs step 209; or if the target timing advance is not less than the second preset threshold, performs step 206.

For user equipment that is determined as a remote user, the base station determines whether a target timing advance corresponding to the user equipment is less than the second preset threshold; and if the target timing advance corresponding to the user equipment is less than the second preset threshold, performs step 209; or if the target timing advance corresponding to the user equipment is not less than the second preset threshold, performs step 206 again in a next specified adjustment period.

It should be understood that, in this embodiment of this application, a value of the second preset threshold $T_{th}^{dw}$ is usually set near 0, and may be a positive number or a negative number. This is not specifically limited herein.

209. The base station determines that the user equipment meets the trigger condition.

For the user equipment that is determined as a near user, when determining that the target timing advance corresponding to the user equipment is greater than the first preset threshold, the base station determines that the user equipment meets the trigger condition.

For the user equipment that is determined as a remote user, when determining that the target timing advance corresponding to the user equipment is less than the second preset threshold, the base station determines that the user equipment meets the trigger condition.

210. The base station sends a trigger signal to the user equipment.

For a near user or a remote user, after determining that the user equipment meets the trigger condition, the base station may send the trigger signal to the user equipment. Specifically, the trigger signal may be a physical downlink control channel order (PDCCH Order) or another trigger signal. This is not specifically limited herein.

In addition, after receiving the trigger signal, the user equipment sends a first random access request to the user equipment. After receiving the first random access request, the base station may determine, based on the first random access request, that the user equipment is a near user or a remote user. Specifically, the base station may re-identify the user equipment in the manners of step 202 to step 204, and then send a responding random access response to the user equipment, to complete second-time random access of the user equipment.

It should be noted that, in this embodiment of this application, after the user equipment receives the random access response sent by the base station and completes random access based on the random access response, measurement on the target timing advance may be inaccurate if accumulated time is long.

Optionally, in this embodiment of this application, a fifth preset threshold $T_{th}^{preup}$ and a sixth preset threshold $T_{th}^{predw}$ may be set. After the user equipment completes random access, for the user equipment that is determined as a near user, the base station determines, at an interval of preset duration, whether the target timing advance of the user equipment is greater than the fifth preset threshold $T_{th}^{preup}$. If the target timing advance of the user equipment is greater than the fifth preset threshold $T_{th}^{preup}$, the base station performs step 209 and step 210. To be specific, the base station determines that the user equipment meets the trigger condition and sends the trigger signal to the user equipment. For the user equipment that is determined as a remote user, the base station determines, at an interval of preset duration, whether the target timing advance of the user equipment is less than the fifth preset threshold $T_{th}^{predw}$. If the target timing advance of the user equipment is less than the fifth preset threshold $T_{th}^{preup}$, the base station performs step 209 and step 210. To be specific, the base station may determine that the user equipment meets the trigger condition and send the trigger signal to the user equipment.

It should be understood that, in this embodiment of this application, the fifth preset threshold $T_{th}^{preup}$ is less than the first preset threshold $T_{th}^{up}$, the sixth preset threshold $T_{th}^{predw}$ is less than the second preset threshold $T_{th}^{dw}$, and the preset duration is less than an adjustment period length. Specifically, values of the fifth preset threshold and the sixth preset threshold may be determined based on an empirical value.

In this embodiment of this application, the base station may adjust, based on the timing adjustment amount, the access timing advance corresponding to the user equipment, and then determine, based on the adjusted timing advance, whether the user equipment meets the trigger condition. When determining that the user equipment meets the trigger condition, the base station may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

This embodiment of this application provides a plurality of manners of identifying the user equipment as a near user or a remote user, thereby improving flexibility of the solution.

In this embodiment of this application, whether the user equipment meets the trigger condition is determined within a specified timing adjustment period based on the target timing advance. In addition, after the user equipment completes random access, whether the user equipment meets the trigger condition may be predetermined at an interval of preset duration based on the target timing advance, thereby improving accuracy of the solution.

For ease of understanding, the following describes the communication connection method in the embodiments of this application in an application scenario.

A distance between user equipment A and a base station B is 80 kilometers. In this case, A attempts to establish a communication connection to B, and A sends a random access request to B. B demodulates the first random access request at a first reference moment to obtain a first correlation peak value (500) and a first TA value (1026×0.52 microseconds), and then demodulates the first random access request at a second reference moment to obtain a second correlation peak value (30) and a second TA value (1344×00.52 microseconds).

Because the first correlation peak value is greater than the second correlation peak value and the second TA value is greater than the fourth preset threshold (10×0.52 microseconds), B determines that A is a near user and determines that the first TA value is an access timing advance corresponding to A. B sends a random access response to A. The response includes the first TA value. A sends uplink data to B based on the first TA value, and B measures, in a first specified adjustment period, the uplink data sent by A, to obtain a timing adjustment amount (2) corresponding to the adjustment period. Then, B adjusts the first TA value based on the timing adjustment amount to obtain a target TA value (51028×0.52 microseconds). The target timing advance is not greater than the first preset threshold (1290×0.52 microseconds). B repeatedly performs the foregoing steps in a second specified period until a target TA value that is obtained by adjusting the first TA value based on the measured timing adjustment amount by B in an Nth specified period is greater than the first preset threshold (1290×0.52 microseconds). B determines that A meets the trigger condition and B sends a PDCCH order to A.

In this case, a distance between A and B is 101 kilometers, and A receives the PDCCH order and sends a random access request again to B based on the signal. B demodulates the random access request at another first reference moment to obtain a third correlation peak value (50) and a third TA value (1280×0.52 microseconds), and then demodulates the random access request at another second reference moment to obtain a fourth correlation peak value (600) and a fourth TA value (13×0.52 microseconds).

Because the third correlation peak value (50) is less than the fourth correlation peak value (600), B determines that A is a remote user and determines that the fourth TA value (13*0.52 microseconds) is an access timing advance corresponding to A. B sends a random access response to A. The response includes the fourth TA value. A sends uplink data to B based on the fourth TA value. B receives the uplink data sent by A, and postpones alignment of the uplink data by one slot. In this way, seamless transition is implemented when A moves from a place within 100 kilometers to a place outside 100 kilometers.

Figure 3:
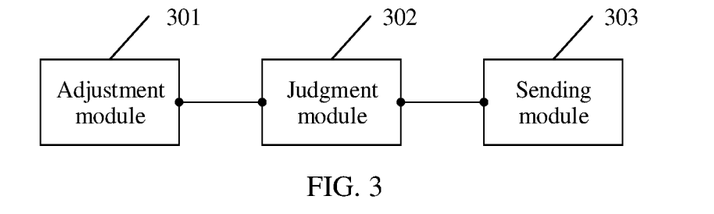
FIG. 3 is a schematic diagram of an embodiment of a base station according to an embodiment of this application.

The foregoing describes the communication connection method in the embodiments of this application. The following describes a base station in the embodiments of this application. Referring to FIG. 3, an embodiment of the base station in the embodiments of this application includes: an adjustment module 301, configured to adjust, based on a timing adjustment amount, an access timing advance corresponding to user equipment to obtain a target timing advance, where the access timing advance is a timing advance obtained when the user equipment randomly accesses the base station; a judgment module 302, configured to determine, based on the target timing advance, whether the user equipment meets a trigger condition; and a sending module 303, configured to send a trigger signal to the user equipment when the judgment module determines that the user equipment meets the trigger condition, where the trigger signal is used to trigger the user equipment to send a first random access request to the base station.

It should be understood that, in the embodiment corresponding to FIG. 3, procedures executed by the modules of the base station are similar to the method procedures described in the embodiment shown in FIG. 1, and details are not described herein.

In this embodiment of this application, the adjustment module 301 may adjust, based on the timing adjustment amount, the access timing advance corresponding to the user equipment, and then the judgment module 302 determines, based on the adjusted timing advance, whether the user equipment meets the trigger condition. When it is determined that the user equipment meets the trigger condition, the sending module 303 may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

Figure 4:
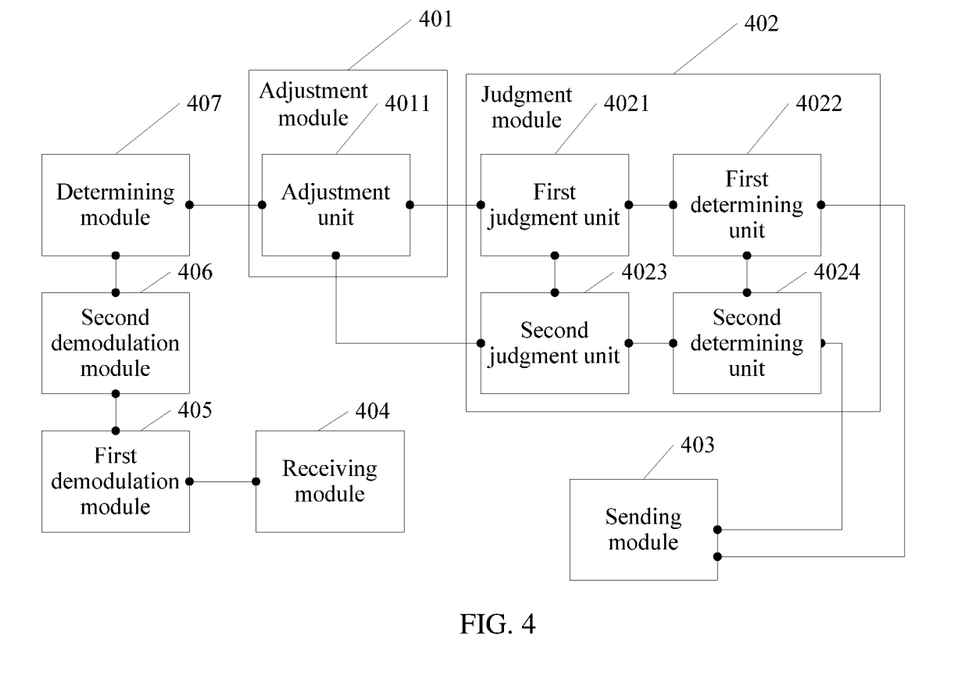
FIG. 4 is a schematic diagram of another embodiment of a base station according to an embodiment of this application.

For ease of understanding, the following describes a base station in the embodiments of this application in detail. Referring to FIG. 4, another embodiment of the base station in the embodiments of this application includes: an adjustment module 401, configured to adjust, based on a timing adjustment amount, an access timing advance corresponding to user equipment to obtain a target timing advance, where the access timing advance is a timing advance obtained when the user equipment randomly accesses the base station; a judgment module 402, configured to determine, based on the target timing advance, whether the user equipment meets a trigger condition; and a sending module 403, configured to send a trigger signal to the user equipment when the judgment module 402 determines that the user equipment meets the trigger condition, where the trigger signal is used to trigger the user equipment to send a first random access request to the base station.

The judgment module 402 may include: a first judgment unit 4021, configured to determine whether the target timing advance is greater than a first preset threshold; and a first determining unit 4022, configured to: when the first judgment unit 4021 determines that the target timing advance is greater than the first preset threshold, determine that the user equipment meets the trigger condition; and/or a second judgment unit 4023, configured to determine whether the target timing advance is less than a second preset threshold; and a second determining unit 4024, configured to: when the second judgment unit 4023 determines that the target timing advance is less than the second preset threshold, determine that the user equipment meets the trigger condition.

Optionally, in this embodiment of this application, the base station may further include: a receiving module 404, configured to receive a second random access request sent by the user equipment; a first demodulation module 405, configured to demodulate the second random access request at a first reference moment to obtain first information; a second demodulation module 406, configured to demodulate the second random access request at a second reference moment to obtain second information; and a determining module 407, configured to determine, based on the first information and the second information, that the user equipment is a near user or a remote user.

Optionally, in this embodiment of this application, the first information may include a first timing advance corresponding to the user equipment, and a first correlation peak value between an access sequence corresponding to the second random access request and a first reference sequence; and the second information may include a second timing advance corresponding to the user equipment, and a second correlation peak value between the access sequence corresponding to the second random access request and a second reference sequence. Correspondingly, the determining module 407 may include (not shown in the figure): a third determining unit, configured to: when the first correlation peak value is greater than the second correlation peak value and the first timing advance is less than a third preset threshold, determine that the user equipment is a near user; a fourth determining unit, configured to: when the first correlation peak value is greater than the second correlation peak value and the second timing advance is greater than a fourth preset threshold, determine that the user equipment is a near user; a fifth determining unit, configured to: when the first correlation peak value is less than the second correlation peak value, determine that the user equipment is a remote user; and a sixth determining unit, configured to: when the first timing advance is greater than a third preset threshold and the second timing advance is less than a fourth preset threshold, determine that the user equipment is a remote user.

Optionally, in this embodiment of this application, the adjustment module 401 may include: an adjustment unit 4011, configured to adjust, by using the following formula, the access timing advance $T_{rach}$ to obtain the target timing advance $T_{all}$:

$$T_{all}=TA_{rach}+TA_{Dmrs}^1+TA_{Dmrs}^2+\ldots TA_{Dmrs}^i, \text{ where}$$

$TA_{Dmrs}^1$ represents a timing adjustment amount corresponding to a first period, $TA_{Dmrs}^2$ represents a timing adjustment amount corresponding to a second period, and $TA_{Dmrs}^i$ represents a timing adjustment amount corresponding to an ith period.

Optionally, in this embodiment of this application, the trigger signal may be a physical downlink control channel order.

It should be understood that, in the embodiment corresponding to FIG. 4, procedures executed by the modules of the base station are similar to the method procedures described in the embodiment shown in FIG. 2, and details are not described herein.

In this embodiment of this application, the adjustment module 401 may adjust, based on the timing adjustment amount, the access timing advance corresponding to the user equipment, and then the judgment module 402 determines, based on the adjusted timing advance, whether the user equipment meets the trigger condition. When it is determined that the user equipment meets the trigger condition, the sending module 403 may send the trigger signal to the user equipment, so that the user equipment sends the first random access request to the base station. In other words, the base station may measure a distance between the user equipment and the base station in real time based on the timing adjustment amount. When the distance meets the trigger condition, the base station may trigger the user equipment to send a random access request again and access the base station again. In this case, even if the UE outside 100 kilometers moves towards the base station to reach a 100-kilometer boundary, or the UE within 100 kilometers moves away from the base station to reach a 100-kilometer boundary, no call drop occurs, thereby implementing seamless transition of the UE at the 100-kilometer boundary and improving user experience.

This embodiment of this application provides a manner of identifying the user equipment as a near user or a remote user, and a specific manner of adjusting the access timing advance, thereby improving flexibility of the solution.

Figure 5:
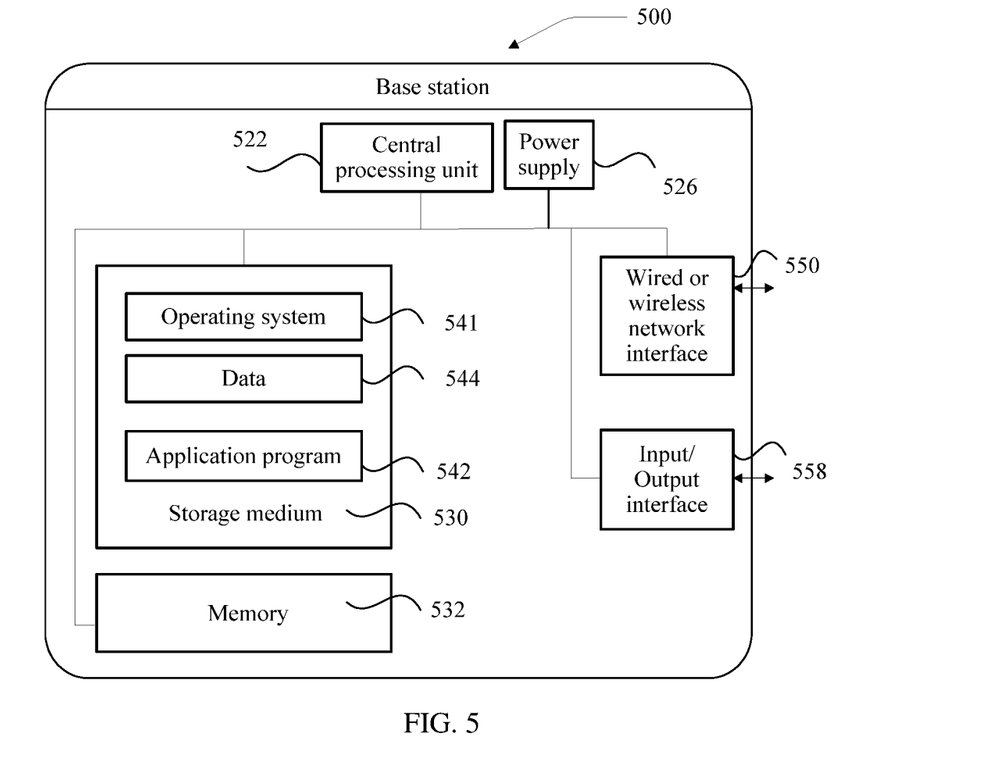
FIG. 5 is a schematic diagram of another embodiment of a base station according to an embodiment of this application.

The foregoing describes the base station in the embodiments of this application from a perspective of a function module. The following describes the base station in the embodiments of this application from a perspective of physical hardware. FIG. 5 is a schematic structural diagram of a base station according to an embodiment of this application. The base station 500 may have a relatively large difference due to different configuration or performance, and may include one or more central processing units (CPU) 522 (for example, one or more processors) and a memory 532, and one or more storage media 530 (for example, one or more mass storage devices) for storing an application program 542 or data 544. The memory 532 and the storage medium 530 may be transient storage or persistent storage. A program stored in the storage medium 530 may include one or more modules (not shown in the figure), and each module may include a series of instruction operations on the base station. Still further, the central processing unit 522 may be configured to: communicate with the storage medium 530, and execute, on the base station 500, a series of instruction operations in the storage medium 530.

The base station 500 may further include one or more power supplies 526, one or more wired or wireless network interfaces 550, one or more input/output interfaces 558, and/or one or more operating systems 541, such as Windows Server™, Mac OS X™, Unix™, Linux™, or FreeBSD™.

The steps performed by the base station in the foregoing embodiment may be based on a base station structure shown in FIG. 5.

An embodiment of this application further provides a computer storage medium. The computer storage medium is configured to store a computer instruction used by the base station, and the computer instruction includes a program designed for the base station.

All or some of the foregoing embodiments may be implemented by using software, hardware, firmware, or any combination thereof. When software is used to implement the embodiments, the embodiments may be implemented all or partially in a form of a computer program product.

The computer program product includes one or more computer instructions. When the computer program instruction is loaded and executed on a computer, the procedures or the functions in the embodiments of this application are all or partially generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for a purpose of convenient and brief description, for a detailed working process of the system, the apparatus, and the unit described above, reference may be made to a corresponding process in the foregoing method embodiments. Details are not described herein.

In the several embodiments provided in this application, it should be understood that the disclosed system, apparatus, and method may be implemented in another manner. For example, the described apparatus embodiment is merely an example. For example, a division of the units is merely a logical function division and may be another division during actual implementation. For example, a plurality of units or components may be combined or integrated into another system, or some features may be ignored or may be not performed. In addition, the displayed or discussed mutual couplings, direct couplings, or communication connections may be implemented by using some interfaces. Indirect couplings or communication connections between the apparatuses or the units may be implemented in electronic, mechanical, or another form.

The units described as separate parts may or may not be physically separate, and parts displayed as units may or may not be physical units, which may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the current system, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof without departing from spirit and scope of the technical solutions of the embodiments of this application.

What is claimed is:

1. A method, comprising:
    receiving, by a base station, a second random access request from a user equipment;
    demodulating, by the base station, the second random access request at a first reference moment to obtain first information;
    demodulating, by the base station, the second random access request at a second reference moment to obtain second information;
    determining, by the base station, according to the first information and the second information, whether the user equipment is a near user or a remote user;
    adjusting, by the base station according to a timing adjustment amount, after determining, according to the first information and the second information, whether the user equipment is a near user or a remote user, an access timing advance corresponding to user equipment to obtain a target timing advance, wherein the access timing advance is a timing advance obtained when the user equipment randomly accesses the base station;
    determining, by the base station according to the target timing advance, whether the user equipment meets a trigger condition; and
    when the user equipment meets the trigger condition, sending, by the base station, a trigger signal to the user equipment, wherein the trigger signal triggers the user equipment to send a first random access request to the base station.

2. The method according to claim 1, wherein:
    the user equipment is a near user, and the near user is user equipment whose distance from the base station is within a preset value when the near user randomly accesses the base station; and
    determining, by the base station according to the target timing advance, whether the user equipment meets the trigger condition comprises:
        determining, by the base station, whether the target timing advance is greater than a first preset threshold; and
        when the target timing advance is greater than the first preset threshold, determining, by the base station, that the user equipment meets the trigger condition.

3. The method according to claim 1, wherein:
    the user equipment is a remote user, and the remote user is user equipment whose distance from the base station is beyond a preset value when the remote user randomly accesses the base station; and
    determining, by the base station according to the target timing advance, whether the user equipment meets the trigger condition comprises:
        determining, by the base station, whether the target timing advance is less than a second preset threshold; and
        when the target timing advance is less than the second preset threshold, determining, by the base station, that the user equipment meets the trigger condition.

4. The method according to claim 1, wherein:
    the first information comprises:
        a first timing advance corresponding to the user equipment; and
        a first correlation peak value between an access sequence corresponding to the second random access request and a first reference sequence;
    the second information comprises:
        a second timing advance corresponding to the user equipment; and
        a second correlation peak value between the access sequence corresponding to the second random access request and a second reference sequence; and
    determining, by the base station according to the first information and the second information, whether the user equipment is a near user or a remote user comprises:
        when the first correlation peak value is greater than the second correlation peak value and the first timing advance is less than a third preset threshold, determining, by the base station, that the user equipment is a near user;

when the first correlation peak value is greater than the second correlation peak value and the second timing advance is greater than a fourth preset threshold, determining, by the base station, that the user equipment is a near user;

when the first correlation peak value is less than the second correlation peak value, determining, by the base station, that the user equipment is a remote user; and when the first timing advance is greater than a third preset threshold and the second timing advance is less than a fourth preset threshold, determining, by the base station, that the user equipment is a remote user.

5. The method according to claim 1, wherein adjusting, by the base station according to the timing adjustment amount, the access timing advance corresponding to the user equipment to obtain the target timing advance comprises:

adjusting, by the base station according to a first formula, the access timing advance to obtain the target timing advance, wherein the first formula is $T_{all}=TA_{rach}+TA_{Dmrs}^1+TA_{Dmrs}^2+\ldots TA_{Dmrs}^i$, and wherein $TA_{rach}$ is the access timing advance, $T_{all}$ is the target timing advance, $TA_{Dmrs}^1$ represents a timing adjustment amount corresponding to a first period, $TA_{Dmrs}^2$ represents a timing adjustment amount corresponding to a second period, and $TA_{Dmrs}^i$ represents a timing adjustment amount corresponding to an ith period.

6. The method according to claim 1, wherein the trigger signal comprises a physical downlink control channel order.

7. A base station, comprising:
a processor; and
a non-transitory computer-readable storage medium storing a program to be executed by the processor, the program including instructions to:
receive a second random access request from a user equipment;
demodulate the second random access request at a first reference moment to obtain first information;
demodulate the second random access request at a second reference moment to obtain second information;
determine, according to the first information and the second information, whether the user equipment is a near user or a remote user;
adjust, according to a timing adjustment amount, after determining, according to the first information and the second information, whether the user equipment is a near user or a remote user, an access timing advance corresponding to user equipment to obtain a target timing advance, wherein the access timing advance is a timing advance obtained when the user equipment randomly accesses the base station;
determine, according to the target timing advance, whether the user equipment meets a trigger condition; and
send a trigger signal to the user equipment when the user equipment meets the trigger condition, wherein the trigger signal triggers the user equipment to send a first random access request to the base station.

8. The base station according to claim 7, wherein:
the user equipment is a near user, and the near user is user equipment whose distance from the base station is within a preset value when the near user randomly accesses the base station; and the instructions include further instructions to:
determine whether the target timing advance is greater than a first preset threshold; and
when t the target timing advance is greater than the first preset threshold, determine that the user equipment meets the trigger condition.

9. The base station according to claim 7, wherein:
the user equipment is a remote user, and the remote user is user equipment whose distance from the base station is beyond a preset value when the remote user randomly accesses the base station; and the instructions comprise further instructions to:
determine whether the target timing advance is less than a second preset threshold; and
when the target timing advance is less than the second preset threshold, determine that the user equipment meets the trigger condition.

10. The base station according to claim 7, wherein:
the first information comprises:
a first timing advance corresponding to the user equipment; and
a first correlation peak value between an access sequence corresponding to the second random access request and a first reference sequence;

the second information comprises:
a second timing advance corresponding to the user equipment; and
a second correlation peak value between the access sequence corresponding to the second random access request and a second reference sequence; and the instructions include further instructions to:
when the first correlation peak value is greater than the second correlation peak value and the first timing advance is less than a third preset threshold, determine that the user equipment is a near user;

when the first correlation peak value is greater than the second correlation peak value and the second timing advance is greater than a fourth preset threshold, determine that the user equipment is a near user;

when the first correlation peak value is less than the second correlation peak value, determine that the user equipment is a remote user; and when the first timing advance is greater than a third preset threshold and the second timing advance is less than a fourth preset threshold, determine that the user equipment is a remote user.

11. The base station according to claim 7, wherein the instructions comprise further instructions to:
adjust, according to a first formula, the access timing advance to obtain the target timing advance, wherein the first formula is $T_{all}=TA_{rach}+TA_{Dmrs}^1+TA_{Dmrs}^2+\ldots TA_{Dmrs}^i$, and wherein $TA_{rach}$ represents the access timing advance, $T_{all}$ represents the target timing advance, $TA_{Dmrs}^1$ represents a timing adjustment amount corresponding to a first period, $TA_{Dmrs}^2$ represents a timing adjustment amount corresponding to a second period, and $TA_{Dmrs}^i$ represents a timing adjustment amount corresponding to an ith period.

12. The base station according to claim 7, wherein the trigger signal comprises a physical downlink control channel order.

13. A base station, comprising:
a transceiver;
a non-transitory memory configured to store a program; and
a processor configured to execute the program, the program causes the processor to perform the following steps:
  receive a second random access request from a user equipment;
  demodulate the second random access request at a first reference moment to obtain first information;
  demodulate the second random access request at a second reference moment to obtain second information;
  determine, according to the first information and the second information, whether the user equipment is a near user or a remote user;
  adjusting, according to a timing adjustment amount, after determining, according to the first information and the second information, whether the user equipment is a near user or a remote user, an access timing advance corresponding to user equipment to obtain a target timing advance, wherein the access timing advance is a timing advance obtained when the user equipment randomly accesses the base station;
  determining, according to the target timing advance, whether the user equipment meets a trigger condition; and
  when the user equipment meets the trigger condition, controlling the transceiver to send a trigger signal to the user equipment, wherein the trigger signal triggers the user equipment to send a first random access request to the base station.

* * * * *